Jan. 26, 1932.  W. A. CHRYST  1,842,822

HYDRAULIC SHOCK ABSORBER

Filed Oct. 24, 1929  2 Sheets-Sheet 1

Inventor
William A. Chryst
Spencer, Hardman & John
Attorneys

Patented Jan. 26, 1932

1,842,822

UNITED STATES PATENT OFFICE

WILLIAM A. CHRYST, OF DAYTON, OHIO, ASSIGNOR TO DELCO PRODUCTS CORPORATION, OF DAYTON, OHIO, A CORPORATION OF DELAWARE

HYDRAULIC SHOCK ABSORBER

Application filed October 24, 1929. Serial No. 402,092.

This invention relates to improvements in hydraulic shock absorbers particularly adapted to control both the compression and rebound movements of vehicle springs.

It is among the objects of the present invention to provide a double acting shock absorber with means adapted automatically to adjust engaging operating parts whereby wear between these parts will automatically be compensated for.

Further objects and advantages of the present invention will be apparent from the following description, reference being had to the accompanying drawings wherein a preferred embodiment of one form of the present invention is clearly shown.

Figure 1:
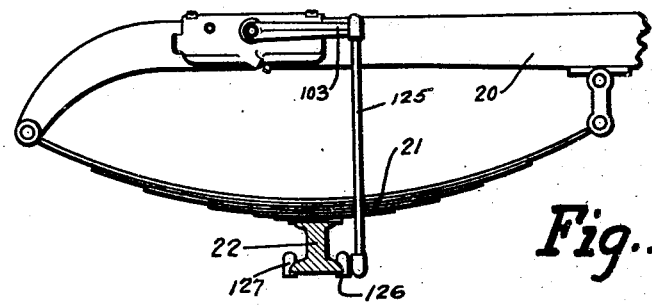
Fig. 1 is a fragmentary view of the front end of a vehicle chassis, certain parts being omitted for the sake of clearness, a shock absorber being attached to the chassis embodying the present invention.

Referring to the drawings, the numeral 20 designates the frame of the vehicle having springs 21 attached thereto which support the frame 20 upon the axle 22.

The shock absorber comprises a housing 23 presenting a fluid reservoir 24 and a cylinder 25. The one end of the cylinder is closed by the end wall 26, the other end by a screw plug 27 provided with a gasket 28 for preventing leaks at this end of the casing. The intermediate portion of the cylinder communicates with the fluid reservoir 24 through the opening 29.

A fluid displacement member or piston 30 is provided in the cylinder, said piston forming a compression chamber at each end of the cylinder, the one chamber being designated by the numeral 31, the other by the numeral 32.

In order to more clearly understand the construction of the piston, the following description will be made with reference to Figs. 4, 5, 6, 7, 8, and 9 in particular.

Figure 2:
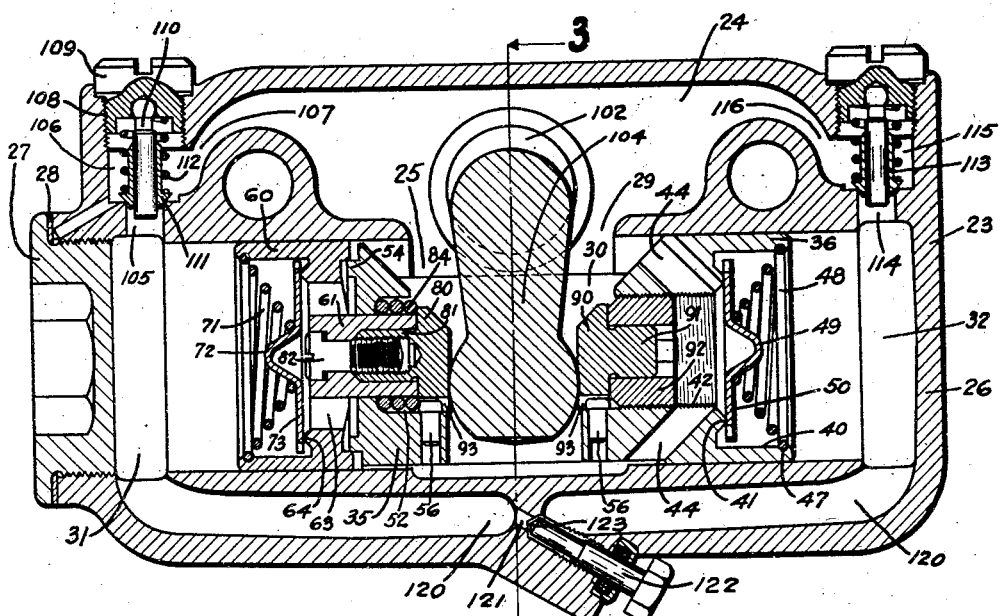
Fig. 2 is a longitudinal sectional view taken through the center of the shock absorber.
Figure 3:
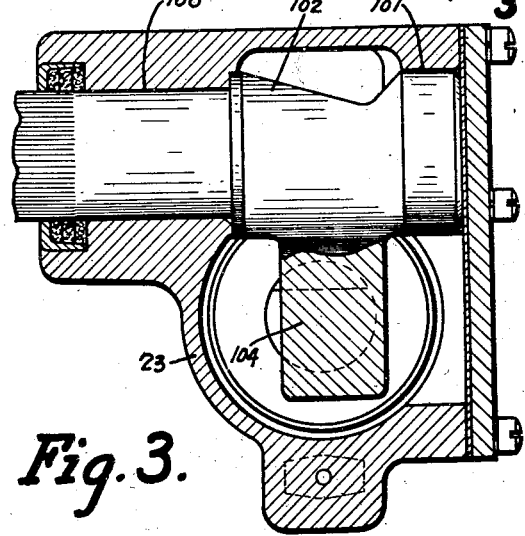
Fig. 3 is a transverse sectional view taken along the line 3—3 of Fig. 2.
Figure 4:
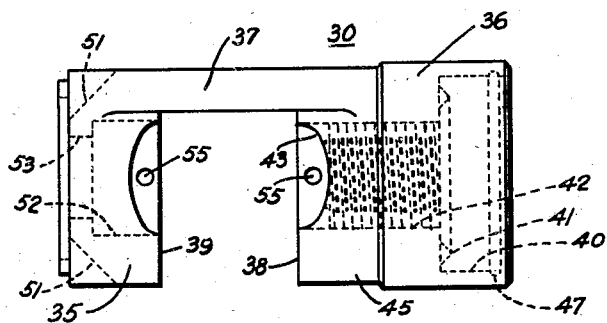
Fig. 4 is a plan view of a portion of the fluid displacement member.
Figures 5, 6, 7:
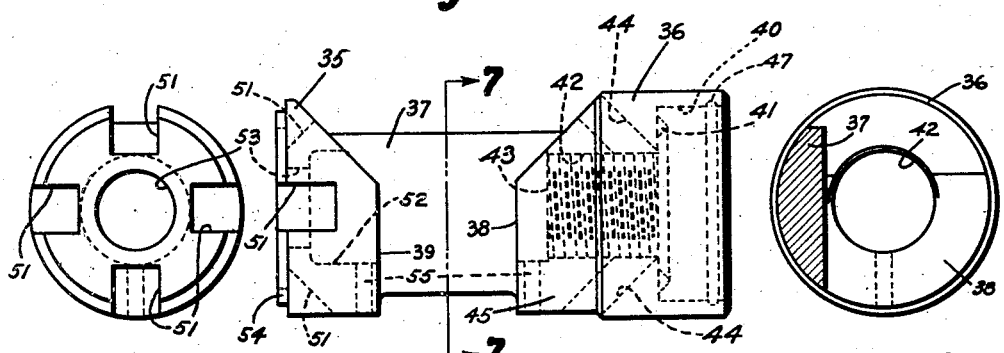
Fig. 5 is a side view of the member shown in Fig. 4.
Fig. 6 is a view of the left end of the member shown in Fig. 5.
Fig. 7 is a transverse section taken along the line 7—7 of Fig. 5.
Figures 8, 9:
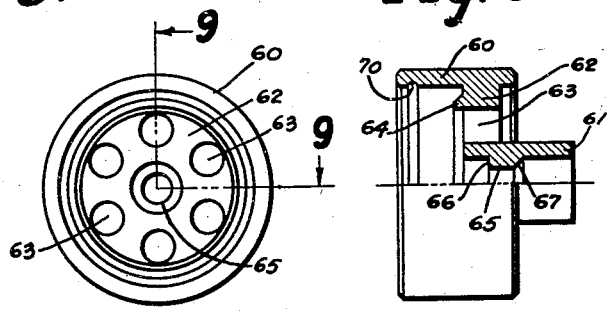
Fig. 8 is an end view of the one piston member.
Fig. 9 is a sectional view taken along the line 9—9 of Fig. 8.

The piston 30 comprises two cylindrical blocks 35 and 36 connected together in spaced relation by a web portion 37 so that both blocks are axially aligned. The block 36 being of slightly greater diameter than the block 35, forms one piston head of the piston 30. Block 36 has a wall 38 which is spaced from and substantially parallel with a corresponding wall 39 of the block 35. Block 36 is adapted slidably to fit within the cylinder 25. The outer end of block 36 is recessed as shown by the dotted lines 40, the bottom of the recess having an annular ridge 41 providing a valve seat. A passage 42 coaxial of block 36 provides communication between the recess 40 at the outer end of the block and a similar recess 43 at the inner end of the block. Passage 42 is provided with screw threads as shown in the Fig. 2. Channels 44 provide communication between the passage 42 and the outside of the reduced portion 45 of the piston head portion 36. An annular groove 47 is provided in the annular wall of recess 40, said groove being adapted to receive the largest convolution of a spring 48, said spring being wound spherically in frustro-conical shape, the smaller end convolution fitting about a hub 49 provided on the valve 50, said spring yieldably urging said valve into engagement with the valve seat 41 which encompasses the passage 42 and the channels 44 as shown in Figs. 2, 4 and 5.

The block 35 of the piston does not form a piston head, for this block is considerably smaller in diameter than the inside diameter of the cylinder 25. Block 35 has four channels 51 provided in its outer peripheral end surface, said channels being adapted to transfer fluid from one side of the block 35 to the other. A recess 52 is provided on the inner surface of block 35, or more particularly in the surface facing the block 36. An opening 53 of smaller diameter than the recess 52 provides communication between the recess and the outer end of block 35. On the outer end of block 35 there is provided an annular flange 54 substantially coaxial of the opening 53. Both blocks 35 and 36 have transverse openings 55 leading to the respective recesses 52 and 43, said openings being adapted to receive pins 56, the purposes of which will be described hereinafter.

Piston 30 also carries a piston head portion 60 which is movable longitudinally relative to the piston head portion 36. As seen in the Figs. 8 and 9 in particular, piston head portion 60 is in the form of an annular ring-shaped member having a tubular hub 61. The hub 61 is secured to the annular piston by a web portion 62 which has a plurality of openings 63 provided therein for purposes of transferring fluid from one side of the piston head portion 60 to the other. An annular ridge 64 in the web portion 62 provides a valve seat which encompasses all of the openings 63. The hub portion 61 has an inwardly extending annular flange 65 presenting a flat edge 66 on one side and a sloping edge 67 on the other. As shown in the Fig. 9, web portion 62 has its surface 68 spaced somewhat from the rear surface 69 of the piston head portion 60, forming a recess which is adapted slidably to receive the annular flange 54 extending from the piston block 35. This is clearly shown in the Fig. 2. The inner surface of the piston head portion 60 has an annular groove 70 for receiving the largest convolution of the frustro-conically shaped spiral spring 71, the smaller end convolution of which grips the hub portion 72 of valve 73, thereby supporting said valve and yieldably urging it into engagement with the valve seat 64. The piston head portion 60 is adapted to fit slidably into the cylinder 25.

Piston head portion 60 is secured to the piston block 35 in the following manner:

Referring to the Fig. 2, a wear-piece 80 has a reduced shank portion 81 which fits into the outer end of the tubular hub 61 of the piston head portion 60. A shank portion 81 of the wear-piece is recessed, the recess being provided with screw threads for receiving the screw 82, the head of which seats into the recess at the outer end of the tubular hub 61 of the piston head portion 60 engaging the surface 66.

From this it may be seen that the wear-piece 80 is securely attached to the hub 61 of the piston 60. As shown in the Fig. 2 the wear-piece 80 extends over the outer end of the hub 61, presenting a shoulder. Hub 61 is also of lesser diameter than the recess 52 in the block 35 so that a space is provided between the annular wall of the recess 52 and the outer surface of the hub 61. In this space there is provided a coil spring 84, the one end of which engages the bottom wall of the recess 52 in the block 35, the other the shoulder presented by the wear-piece 80. This spring, exerting pressure upon the wear-piece 80, urges the piston 60 toward the right as regards the block 35 in Fig. 2, thus the wear-piece 80 will be urged toward the corresponding wear-piece 90 which is carried by the block 36.

Wear-piece 90, like wear-piece 80, has a shank portion 91 which fits into an opening in the collar 92, the collar 92 which is screw-threadedly received by the passage 42 in the piston block 36. Both wear-pieces 80 and 90 have a slot 93 in the outer edge, said slots being adapted to receive the ends of the respective pins 56 mentioned heretofore, said pins preventing rotation of the wear-pieces 80 and 90 and thus rotation of the collar 92 and the piston head portion 60, the latter relative to the block 35.

From the aforegoing it may be seen that the fluid displacement member or piston 30, comprises a web portion 37 connecting and holding spaced blocks 35 and 36, the latter forming one piston head of the piston. The block 35 supports the piston head 60 so that piston head 60 is maintained longitudinally and coaxially relative to the block 35 and to the piston head portion 36. The spring 84, as has been mentioned, tends to urge the wear-piece 80 toward the wear-piece 90.

The shock absorber casing presents two bearings 100 and 101 in which is journalled the rocker arm 102, the one end of which extends outside the casing and has the operating arm 103 provided thereon. Within the casing the rocker shaft 102 has a rocker lever 104 provided thereon, which lever forms the operating member for the piston. The rounded end of the lever 104 extends between the wear-pieces 80 and 90 when the piston is in position in the cylinder, whereby oscillation of the lever 104 will reciprocate the piston 30 in the cylinder 25. Spring 84 yieldably urges the wear-piece 80 into engagement with the one rounded side of the lever 104 consequently urges the lever into engagement with the co-operating wear-piece 90 so that spring 84 automatically adjusts the wear-piece 80 to compensate for any wear of either of the two wear-pieces 80 and 90 or the lever 104.

Each compression chamber 31 and 32 is provided with a pressure release valve. Inasmuch as these pressure release valves are identical, only one of them will be described.

In the casing 23 there is provided a port 105 which provides communication between the valve chamber 106 and the compression chamber 31. A passage 107 leads from the valve chamber 106 to the fluid reservoir 24. Substantially in coaxial alignment with the port 105, an opening 108 is provided in the casing having screw threads for receiving the plug 109. Plug 109 swivelly supports the pin 110 upon which is carried a valve 111 having a sloping annular surface which is maintained in engagement with the one peripheral edge of the port 105 by a spring 112 interposed between the screw plug 109 and the valve 111. The valve 113 for the compression chamber 32 controls the passage of fluid through the port 114 which connects the compression chamber 32 with the valve chamber 115 in communication with the reservoir 24 through the passage 116.

The compression chambers 31 and 32 are also interconnected by a channel 120 having a restriction 121. A metering pin 122 adjustably carried by the casing 23, has a tapered end 123 which is adapted to be moved into properly adjusted position, relative to the restricted opening 121 in the channel 120, by adjustment of the metering pin 122 whereby the fluid flow from one compression chamber to the other through the duct to the channel 120 and its restricted passage 121 may properly be controlled.

In the Fig 1. the operating lever 103 of the shock absorber has its free end swivelly connected to the link 125, which link is also connected to the bracket 126. Bracket 126 is clamped to the axle 22 by the clamping member 127.

The device functions in the following manner:

When the road wheels of the vehicle, not shown, strike an obstruction in the roadway, springs 21 will be flexed toward the frame 20, this movement resulting in a counter-clockwise rotation of the rocker shaft 102 due to the link connection 125 with the axle 22. The shaft 102 rotating counter-clockwise will cause the lever 104 to move the piston 30 toward the right as regards Fig. 2, and thus fluid from the reservoir 24 will tend to flow through the channels 51 in the block 35, openings 63 in the piston head portion 60 against the valve 73, opening said valve against the effect of spring 71 and thus is established a flow into the compression chamber 31. The piston head portion or block 36 with its valve 50 exerts a pressure upon the fluid in the compression chamber 32, forcing said fluid through the channel 120 and its restricted opening 121 into the compression chamber 31. This restriction to the flow of fluid resists the compression movement of springs 21. If the obstruction met causes the springs 21 to compress more extensively, a greater pressure will be exerted upon the fluid compression chamber 32, which pressure cannot properly be relieved through the passage 120 and its restriction 121, thus the valve 113 will be opened, establishing a pressure relieving flow through the port 114 into the valve chamber 115 and thence into the reservoir 24 through the passage 116. This flow will be established in accordance with the obstruction met or in accordance with the degree of spring compression movement.

The springs 21 when reaching the limit of their flexure, will tend to return to normal, unflexed position with a sudden, rebounding movement which, if not checked, develops disagreeable jars and jolts which are transmitted to the frame 20. The present device, when springs 21 begin to return to unflexed position, is operated so that the lever 104 will be moved clockwise, in which instance the piston head portion 60 with its valve 72 will exert a pressure upon the fluid in the chamber 31, causing it to flow through channel 120 and its restricted passage 121 into the compression chamber 32. If this channel 120 cannot properly relieve the fluid pressure in the compression chamber 31, then the valve 111 will be moved against the effect of its spring 112 to open the port 105, establishing a flow from the chamber 31 through said port 105 into the chamber 106 and through passage 107 into the reservoir 24. Movement of the piston to the left as regards Fig. 2 permits fluid to flow through the channels 44 in the piston head portion 30 against the valve 50 which will be opened to establish a compensating of fluid flow into the chamber 32 under these circumstances.

From the aforegoing it may be seen that the present invention presents a shock absorber adapted to control both the approaching and separating movements of the vehicle frame and springs to cushion and eliminate jars and jolts from being transmitted to the body supported on the frame. It also presents a device in which certain cooperating parts are automatically adjusted to compensate for wear, the device being so designed as to be easily assembled.

While the form of embodiment of the present invention as herein disclosed, constitutes a preferred form, it is to be understood that other forms might be adopted, all coming within the scope of the claims which follow.

What is claimed is as follows:

1. A shock absorber comprising in combination, a casing presenting a fluid reservoir and a cylinder; a reciprocable member in said cylinder providing a piston; a second piston carried by the reciprocable member so as to be movable longitudinally relative thereto; and means rotatably supported in the casing and adapted to engage the pistons to operate said member.

2. A shock absorber comprising in combination, a casing presenting a fluid reservor and a cylinder; a reciprocable member in said cylinder comprising a piston portion, a supporting block spaced from said piston portion, and a web portion connecting the supporting block and piston portion; a piston mounted on the supporting block so as to be movable longitudinally relative thereto; an operating lever rotatably supported by the casing and engaging the pistons for operating them in the cylinder; and resilient means engaging the piston movably carried by the supporting block and urging said piston into engagement with the lever.

3. A shock absorber comprising in combination, a casing providing a cylinder; a fluid displacement member within said cylinder, said member comprising spaced cylindrical blocks connected by a web portion one of said blocks providing a piston; a piston slidably supported by the other of said blocks; a spring interposed between the said piston and its supporting block yieldably urging said piston toward said block; and a lever journalled in the casing and engaging the pistons for reciprocating them within the cylinder.

4. A shock absorber comprising in combination, a casing providing a cylinder; a fluid displacement member within said cylinder, said member comprising spaced cylindrical blocks connected by a web portion one of said blocks providing a piston; a wear piece carried by said piston; a piston slidably supported by the other of said blocks; a wear piece carried by the last mentioned piston; an operating lever oscillatably supported by the casing and extending between the wear pieces of the two pistons.

5. A shock absorber comprising in combination, a casing providing a cylinder; a fluid displacement member within said cylinder, said member comprising spaced cylindrical blocks connected by a web portion one of said blocks providing a piston; a wear piece carried by said piston; a piston slidably supported by the other of said blocks; a wear piece carried by the last mentioned piston; an operating lever oscillatably supported by the casing and extending between the wear pieces of the two pistons; and a spring provided on the slidably supported piston, for urging the wear piece of said piston toward the operating lever.

6. A shock absorber comprising in combination, a casing providing a cylinder; a fluid displacement member within said cylinder, said member comprising spaced cylindrical blocks connected by a web portion one of said blocks providing a piston; a wear piece carried by said piston; a piston slidably supported by the other of said blocks; a wear piece carried by the last mentioned piston; an operating lever oscillatably supported by the casing and extending between the wear pieces of the two pistons; and a coil spring interposed between the one cylindrical block of the fluid displacement member and the wear piece on the piston slidably supported by said block, for urging the wear piece into engagement with the operating lever and said lever in turn into engagement with the wear piece on the other piston.

7. A shock absorber comprising in combination, a casing providing a cylinder; a fluid displacement member within said cylinder, said member comprising spaced cylindrical blocks connected by a web portion one of said blocks providing a piston; channels in said blocks providing for the transfer of fluid from one side of each block to the other; a piston slidably supported by the other of said blocks said piston having channels for the passage of fluid therethrough; an annular valve seat on each piston and encompassing the channels of the respective pistons; and a valve supported by each piston for restricting the flow of fluid through the channels of the respective pistons in one direction.

8. A shock absorber comprising in combination, a casing providing a cylinder; a double headed piston within said cylinder the one head of the piston providing a support upon which the other piston head is slidably carried; and a piston operating member oscillatably supported by the casing.

9. A shock absorber comprising in combination, a casing providing a cylinder; a piston in said cylinder said piston comprising a main body portion and a piston head movably supported thereon; an operating lever oscillatably supported by the casing and adapted to reciprocate the piston; a wear piece carried by the piston head; and means on the piston yieldably urging the wear piece into engagement with the lever.

10. A shock absorber comprising in combination, a casing providing a cylinder; a fluid displacement member within said cylinder said member comprising a main body portion and a piston head portion supported upon said body portion so as to be movable longitudinally relative thereto; an operating lever oscillatably carried by the casing and adapted to reciprocate the said member; a wear piece on the piston head portion; and a spring interposed between the wear piece and the main body portion of said member, and yieldably urging the wear piece into engagement with the operating lever.

In testimony whereof I hereto affix my signature.

WILLIAM A. CHRYST.